United States Patent
Frühauf et al.

(10) Patent No.: US 12,487,294 B2
(45) Date of Patent: Dec. 2, 2025

(54) MAGNETIC FIELD SENSOR AND SENSOR ASSEMBLY

(71) Applicant: Endress+Hauser SE+Co. KG, Maulburg (DE)

(72) Inventors: Dietmar Frühauf, Lörrach (DE); Raphael Kuhnen, Schliengen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 148 days.

(21) Appl. No.: 18/554,764

(22) PCT Filed: Mar. 21, 2022

(86) PCT No.: PCT/EP2022/057316
§ 371 (c)(1),
(2) Date: Oct. 10, 2023

(87) PCT Pub. No.: WO2022/218646
PCT Pub. Date: Oct. 20, 2022

(65) Prior Publication Data
US 2024/0192289 A1  Jun. 13, 2024

(30) Foreign Application Priority Data
Apr. 14, 2021 (DE) ...................... 10 2021 109 408.9

(51) Int. Cl.
*G01R 33/02* (2006.01)
(52) U.S. Cl.
CPC .................................. *G01R 33/02* (2013.01)
(58) Field of Classification Search
None
See application file for complete search history.

(56) References Cited

U.S. PATENT DOCUMENTS

| | | | | |
|---|---|---|---|---|
| 5,566,872 | A * | 10/1996 | Dolan | A61C 15/043 225/41 |
| 6,279,406 | B1 * | 8/2001 | Li | G01R 33/18 73/861.08 |

(Continued)

FOREIGN PATENT DOCUMENTS

| | | |
|---|---|---|
| DE | 102016112198 A1 | 1/2018 |
| DE | 102019134595 A1 | 6/2021 |

(Continued)

OTHER PUBLICATIONS

A magnetoelectric composite based signal generator Y. K. Fetisov, 1,a) V. N. Serov, 1 L. Y. Fetisov, 1 S. A. Makovkin, 1 D. Viehland,2 and G. Srinivasan Moscow Technical University (Mirea), Moscow 119454, Russia (Year: 2016).*

(Continued)

*Primary Examiner* — Richard Isla
(74) *Attorney, Agent, or Firm* — Kelly J. Smith; Endress+Hauser (USA) Holding, Inc.

(57) ABSTRACT

The present invention relates to a magnetic field sensor for detecting a magnetic field, comprising: a magnetoelectric sensor element which can mechanically oscillate, the sensor element having at least one first layer made of a magnetorestrictive material, a second layer made of a piezoelectric material, and at least one electrode made of an electrically conductive material, more particularly metal; and electronics. The magnetic field sensor, more particularly the electronics, is designed to induce mechanical oscillations of the sensor element by means of an excitation signal, to receive the mechanical oscillations of the sensor element and to convert said mechanical oscillations into a reception signal, to produce the excitation signal from the reception signal, and to determine a variable related to the magnetic field on the basis of the reception signal.

10 Claims, 3 Drawing Sheets

(56) References Cited

U.S. PATENT DOCUMENTS

| | | |
|---|---|---|
| 6,397,661 B1 | 6/2002 | Grimes et al. |
| 7,042,213 B2 | 5/2006 | Greywall |
| 10,819,276 B1 | 10/2020 | Kubena et al. |
| 2002/0166382 A1 | 11/2002 | Bachas et al. |
| 2004/0126620 A1* | 7/2004 | Viehland ............... H10N 35/00 |
| | | 335/215 |
| 2015/0168503 A1* | 6/2015 | Kim .................... G01R 33/18 |
| | | 324/244 |
| 2017/0361615 A1 | 12/2017 | Knierim |
| 2017/0370882 A1 | 12/2017 | Chin et al. |
| 2018/0259599 A1 | 9/2018 | Finkel et al. |

FOREIGN PATENT DOCUMENTS

| | | |
|---|---|---|
| GB | 2561886 A | 10/2018 |
| WO | 2017198666 A1 | 11/2017 |

OTHER PUBLICATIONS

Hui, et al., High Resolution Magnetometer Based on a High Frequency Magnetoelectric MEMS-CMOS Oscillator, Journal of Microelectromechanical Systems, vol. 24, No. 1, Feb. 2015, pp. 134-143.

Fetisov, et al., A magnetoelectric composite based signal generator, Applied Physics Letters 108, 213502 (2016), 4 pp.

* cited by examiner

MAGNETIC FIELD SENSOR AND SENSOR ASSEMBLY

CROSS-REFERENCE TO RELATED APPLICATIONS

The present application is related to and claims the priority benefit of DPMA Patent Application No. 10 2021 109 408.9, filed on Apr. 14, 2021, and International Patent Application No. PCT/EP2022/057316, filed Mar. 21, 2022, the entire contents of which are incorporated herein by reference.

TECHNICAL FIELD

The present invention relates to a magnetic field sensor for detecting a magnetic field, comprising a magnetoelectric sensor element which can mechanically oscillate, and to a sensor assembly for determining and/or monitoring at least one process variable and/or characteristic of a medium in a container comprising a magnetic field sensor according to the invention.

BACKGROUND

Field devices for monitoring and/or determining at least one, for example chemical or physical, process variable of a medium are known from the prior art in a wide variety of embodiments. Within the framework of the present application, all measuring devices or sensor assemblies that are used in proximity with the process and supply or process process-relevant information are, in principle, termed field devices, including therefore remote I/O's, wireless adapters and general electronic components located on the field level. The companies of the Endress+Hauser Group produce and distribute a large variety of such field devices.

Many different field devices are based on the measurement of magnetic fields and the identification and/or determination of the respective process variable and/or characteristic on the basis of a variable related to the respective magnetic field. Different types of magnetic field sensors are generally used to detect the magnetic field. The accuracy of such field devices is largely dependent on the measurement accuracy of the magnetic field sensors.

It would thus be desirable to be able to detect a magnetic field as precisely as possible in the simplest possible manner.

Magnetoelectric sensors are used to detect magnetic fields and are based on the mechanical force coupling of magnetostrictive and piezoelectric materials.

Magnetostrictive materials are characterized in that a deformation of the material occurs as a result of an applied magnetic field. In this context, a distinction is made between Joule magnetostriction, which means a change in length as a result of a change in magnetization, the Villari effect, the inverse magnetostrictive effect, in which a change in the magnetic properties occurs as a result of mechanical stress, and the delta-E effect, which describes a change in the modulus of elasticity as a result of a change in magnetization. Magnetostrictive materials are, for example, given by ferromagnetic transition metals, such as iron, nickel or cobalt or alloys thereof, for example alloys of cobalt and iron, of gallium and iron or galfenol, or terbium, dysprosium and iron or terfenol, and also various further compounds of the transition metals with rare earths or also different ferromagnetic glasses.

Piezoelectric materials are characterized by the change in electrical polarization and thus the occurrence of a voltage as a result of elastic deformation. Piezoelectric materials are, for example, given by lead zirconate titanate, polyvinylidene fluoride or aluminum nitride.

In the case of a magnetoelectric sensor, a magnetostrictive material is firmly coupled to a piezoelectric material. As a result of an applied magnetic field, the magnetostrictive material experiences a change in length in the direction of the acting magnetic field and/or a change in the modulus of elasticity. The length extension exerts a force on the piezoelectric material, which leads to a change in the polarization and thereby to the occurrence of a voltage which is electrically detectable. A change in the modulus of elasticity in turn leads to a changed transmission behavior, which is also detectable. For example, it has become known in this context to induce mechanical oscillations in the magnetoelectric sensor by means of the piezoelectric material. In this case, a change in the modulus of elasticity as a result of an applied magnetic field leads to a changed oscillation behavior, which can be evaluated, for example, on the basis of a frequency and/or amplitude of the mechanical oscillations.

Numerous different possible embodiments have become known for the construction of a magnetoelectric sensor. In many cases, a multi-layer structure is used which comprises at least one layer of the magnetostrictive, one layer of the piezoelectric material and optionally one electrode for tapping the voltage. The layer structure often has the shape of a strip which is fastened at one end. Applying a magnetic field then leads to a bending of the strip and to the occurrence of an electrical voltage signal as a reception signal.

Under the influence of a periodic, temporally variable magnetic field with a specifiable frequency, magnetoelectric sensors execute forced oscillations. Resonant oscillations are particularly advantageous, since in this case even comparatively small changes in the magnetic field cause comparatively large voltages. Various ways of setting a resonant frequency of a magnetoelectric sensor have become known, for example, from US2010/0015918A1, DE102011008866A1 or WO2020/253908A1.

An evaluation of the electrical voltage with respect to the frequency typically takes place by means of a so-called sweep method, in which the reception signal is recorded as a function of the frequency and the frequency at which the amplitude of the reception signal is maximum is sought. In such evaluation methods, disadvantageously, the required duration for finding the resonant frequency clearly increases with the achievable accuracy. A precise detection of the resonant frequency is therefore very time-consuming. Moreover, a signal evaluation in which a maximum amplitude has to be determined is comparatively complex.

Other frequently used evaluation methods, such as optical path length measurement, are also comparatively time-consuming.

SUMMARY

Proceeding from this, the object of the present invention is to provide a magnetic field sensor with a magnetoelectric sensor element, in which an evaluation of the reception signal and thus of the sensor behavior can take place in the simplest and at the same time most precise manner possible.

This object is achieved by the magnetic field sensor and by the sensor assembly according to the present disclosure.

With respect to the magnetic field sensor, the object underlying the invention is achieved by a magnetic field sensor for detecting a magnetic field, comprising a magnetoelectric sensor element which can mechanically oscillate, the sensor element having at least one first layer made of a magnetostrictive material, a second layer made of a piezoelectric material, and at least one electrode made of an electrically conductive material, more particularly metal. The magnetic field sensor further comprises electronics. According to the invention, the magnetic field sensor, more particularly the electronics, is designed to induce mechanical oscillations of the sensor element by means of an excitation signal, to receive the mechanical oscillations of the sensor element and to convert said mechanical . . . oscillations into a reception signal, to produce the excitation signal from the reception signal, and to determine a variable related to the magnetic field on the basis of the reception signal.

The magnetic field or the variable related to the magnetic field is evaluated on the basis of the reception signal, which is an electrical voltage signal. The excitation signal, more particularly a frequency of the excitation signal, is produced directly from the reception signal, more particularly from a frequency of the reception signal. The excitation signal can be produced in such a way that the sensor element executes oscillations at a specifiable frequency, more particularly a resonant frequency. In this way, the sensor element oscillates permanently at the specifiable frequency. Therefore, to determine the variable related to the magnetic field, it is advantageously only necessary to evaluate the reception signal, in particular with respect to the frequency of the reception signal.

The sensor element can be produced, for example, by means of coating techniques known per se with or without a predetermined substrate; silicon technology processes can be applied, for example.

In one embodiment, the sensor element is a MEMS sensor element, i.e., a micro-electro-mechanical (MEMS) system.

A further embodiment includes that the sensor element can be induced to resonant oscillations. Resonant oscillations lead to an increase in achievable measurement accuracy with respect to the detection of the magnetic field and are particularly energy-efficient.

In a further embodiment, the magnetic field sensor, more particularly the electronics, is designed to produce the excitation signal from the reception signal such that there is a specifiable phase shift between the excitation signal and the reception signal. In this case, the sensor element is part of a feedback electrical resonant circuit, by means of which the sensor element is induced to mechanical oscillations. For example, the resonant circuit condition according to which the amplification factor is ≥1 and all phases occurring in the resonant circuit result in a multiple of 360° must be fulfilled for a resonant vibration. To excite and fulfill the resonant circuit condition, a defined phase shift must be ensured between the excitation signal and the reception signal. A predeterminable value for the phase shift, thus a setpoint for the phase shift between the excitation signal and the reception signal, is therefore often set. For this purpose, a wide variety of solutions, both analog and digital methods, has become known from the prior art, all of which are applicable to the present invention.

In one embodiment, the electronics, more particularly for setting the specifiable phase shift, comprise a phase control unit, more particularly a phase control unit based on the principle of a lock-in amplifier, a phase shifter, a ring buffer or a filter, more particularly an adaptive filter with adjustable center frequency. However, the present application is by no means limited to the present explicit variants for setting the target phase shift.

According to the invention, the sensor element comprises at least one electrode which serves more particularly for tapping the reception signal. Preferably, the electrode extends over a large part or substantially completely along a surface of the piezoelectric element or the second layer. The use of a single electrode both for transmitting and for receiving is then particularly advantageous with respect to the achievable measurement accuracy, since the electrical voltage can be tapped over a large or maximum volume of the . . . piezoelectric material. Furthermore, such a procedure considerably simplifies the process of manufacturing the magnetoelectric sensor.

However, it is also conceivable to design the sensor element such that several electrodes are present.

For example, one embodiment of the magnetic field sensor provides for the sensor element to comprise at least two electrically insulated electrodes which are applied to the second layer in particular in different regions. In this case, for example, the first electrode can serve for inducing the oscillations and the second electrode for detecting the reception signal.

A further embodiment of the magnetic field sensor includes that the electronics are designed to alternately execute a first and a second operating mode. The electronics are designed in particular to induce mechanical oscillations of the sensor element in the first operating mode by means of an excitation signal, and to interrupt the excitation of the sensor element in the second operating mode, to receive the mechanical oscillations of the sensor element and to convert said mechanical oscillations into a reception signal, and to determine a variable related to the magnetic field and/or a damping, in particular a damping of the sensor element, on the basis of the reception signal. The two operating modes are preferably executed in a periodically alternating manner. The reception signal is evaluated only during the second operating mode. By providing the two operating modes, it is advantageously possible to additionally determine interference influences and, in particular, also a damping of the sensor element and, if necessary, take this into account when determining the variable related to the magnetic field.

It is advantageous if the variable related to the magnetic field is the magnetic flux density, the magnetic susceptibility or the magnetic permeability.

The object underlying the invention is further achieved by a sensor assembly for determining and/or monitoring at least one process variable and/or characteristic of a medium in a container comprising a magnetic field sensor according to the invention according to at least one of the described embodiments. The sensor assembly, more particularly a detection device of the sensor assembly comprising the magnetic field sensor, is preferably designed to determine and/or monitor the process variable and/or characteristic on the basis of the variable related to the magnetic field.

The sensor assembly advantageously comprises a device for producing an, in particular static or periodic, magnetic field in the region of the magnetic field sensor and possibly also in the region of the medium.

One embodiment of the sensor assembly according to the invention includes that the magnetic field sensor and/or the device for producing the magnetic field is arranged and/or designed such that the magnetic field can be influenced as a function of a value for the process variable and/or characteristic of the medium, and that the sensor assembly is designed to determine and/or monitor the process variable and/or characteristic on the basis of the variable related to the magnetic field. Preferably, the sensor device is arranged within an interior volume of the container and the magnetic field sensor is arranged outside the container.

A further embodiment includes that the sensor assembly comprises a sensor device which is designed and/or arranged such that at least one magnetic property of a component of the sensor device is dependent on the process variable and/or characteristic and that the magnetic field of the magnetic field device can be influenced by means of the sensor device as a function of the process variable and/or characteristic.

It is advantageous if the process variable and/or characteristic of the medium is the temperature, the pressure, the conductivity, or a flow rate of the medium.

It should be noted that the embodiments described in connection with the magnetic field sensor can be applied mutatis mutandis to the sensor assembly according to the invention, and vice versa.

BRIEF DESCRIPTION OF THE DRAWINGS

The present disclosure is explained in greater detail with reference to the following figures. Illustrated are.

In the figures, identical elements are provided with the same reference signs.

DETAILED DESCRIPTION

Figure 1A:
FIG. 1 shows two possible embodiments of a magnetoelectric sensor element.

FIG. 1 shows two preferred embodiments of a magnetoelectric sensor element 1. The sensor element 1 from FIG. 1a has a first layer 2 made of a piezoelectric material and a second layer 3 made of a magnetostrictive material which are arranged one above the other and are mechanically coupled to one another. The sensor element 1 has a layer structure, for example in the form of a MEMS component. In other embodiments, further layers or moreover a substrate can be present.

An electrode 4 made of an electrically conductive material is applied along the surface O on the first layer 2 made of the piezoelectric material and serves for detecting a reception signal from the sensor element 1 in the form of an electrical voltage. A second electrode can be provided either by the second layer 3 made of the magnetostrictive material, since magnetostrictive materials are typically electrically conductive. The electrical voltage between the electrode 4 and the second layer 3 can then be tapped. However, it is also conceivable (but not mandatory) to provide a separate additional electrode 5, as shown in FIG. 1a, and to tap the electrical voltage between the electrodes 4 and 5.

Figure 1B:
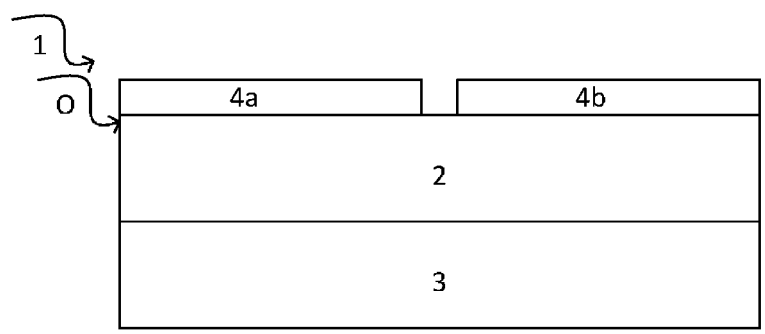

In contrast to the embodiment shown in FIG. 1a, the sensor element 1 from FIG. 1b comprises two electrodes 4a and 4b, the first electrode 4a being an excitation electrode and the second electrode 4b being a reception electrode. The two electrodes 4a and 4b are electrically insulated from one another and applied in different regions of the surface O of the first layer 2 made of the piezoelectric material.

FIG. 2 shows various embodiments of a magnetic field sensor 6 according to the invention with a magnetoelectric sensor element 1 and electronics 7. The sensor element 1 is induced to mechanical oscillations by means of the excitation signal A, and the mechanical oscillations of the sensor element 1 are received and converted into a reception signal E.

Figure 2A:
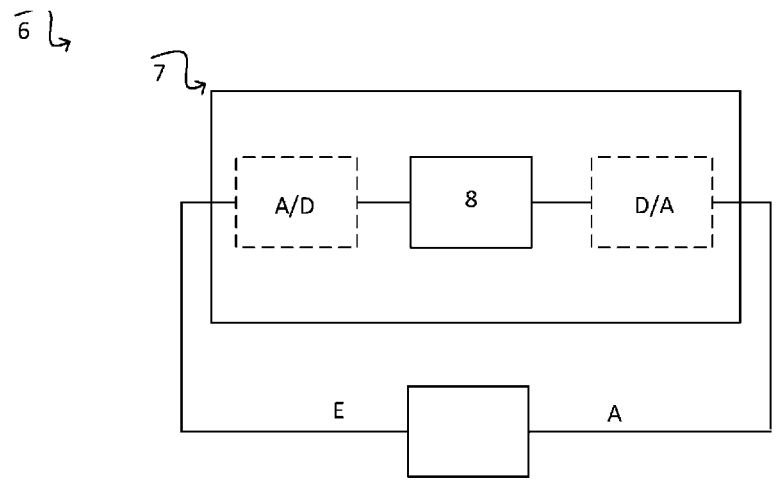
FIG. 2 shows preferred embodiments of electronics of a magnetic field sensor according to the present disclosure.

The electronics 7 shown schematically in FIG. 2a optionally comprise an A/D and a D/A converter, but other embodiments can also comprise analogous electronics 7. Furthermore, the electronics 7 comprise a unit 8, by means of which a specifiable target phase shift $\Delta\Phi$ between the excitation signal A and the reception signal E can be set in order to be able to produce the excitation signal A from the reception signal E. The unit 8 can be, for example, a phase control unit, more particularly a phase control unit based on the principle of a lock-in amplifier, a phase shifter, or a ring buffer.

Figure 2B:
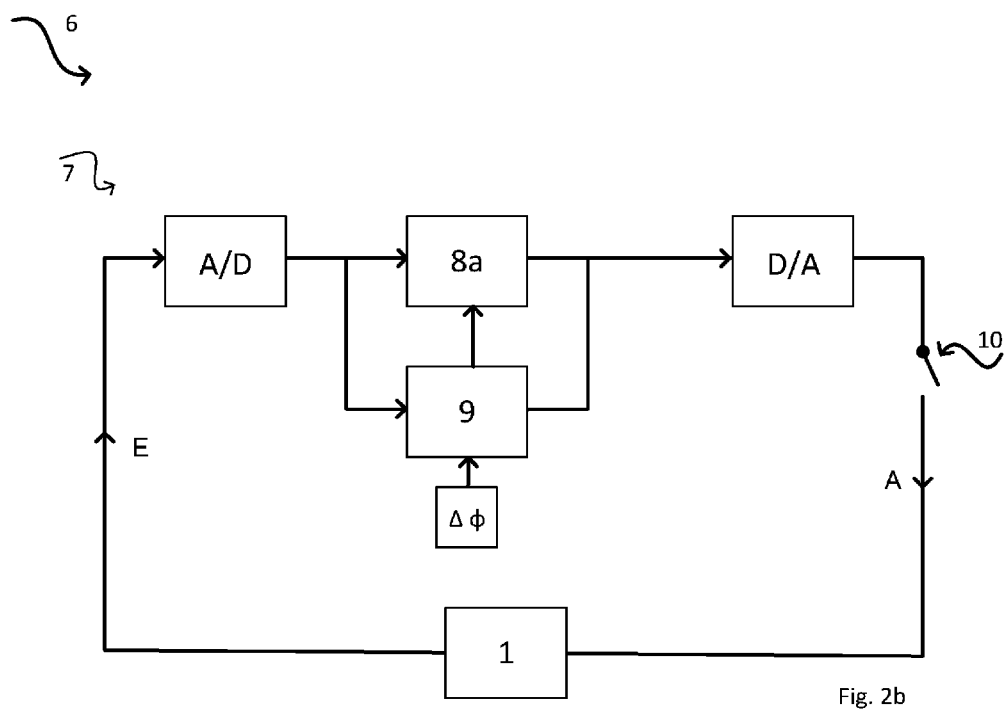

Another possible embodiment of electronics 7 according to the invention is the subject matter of FIG. 2b. In this variant, the phase shift $\Delta\Phi$ is set by means of an adaptive filter 8a. As in the case of FIG. 2a, the reception signal E first passes through an analog-digital converter before it is supplied to the adaptive filter 8a. The filter characteristic of the adaptive filter is adjusted appropriately in order to set the phase shift $\Delta\Phi$. Adjustment of the filter characteristic can be performed, for example, by a phase control unit 9, by means of which a center frequency $f_m$ of the adaptive filter 8a is regulated such that the specifiable phase shift $\Delta\Phi$ is present between the excitation signal A and the reception signal E. The phase control unit 9, in turn, can be based on the principle of a lock-in amplifier, for example.

The use of an adaptive filter 8a for setting the phase shift $\Delta\Phi$ allows for an adjustment regardless of disruptive influences, such as, for example, external vibrations, and is hence particularly robust, in particular as regards external vibrations.

The excitation signal A passes through a digital-analog converter before it is guided from the electronics 7 to the sensor element 1. Furthermore, here, the magnetic field sensor 6 comprises an optional switching element 10 in order to allow the execution of a first and second operating mode, wherein the sensor element 1 is induced to mechanical oscillations in the first operating mode (switching element 10 closed) and excitation is interrupted in the second operating mode (switching element 10 open).

Figure 3:
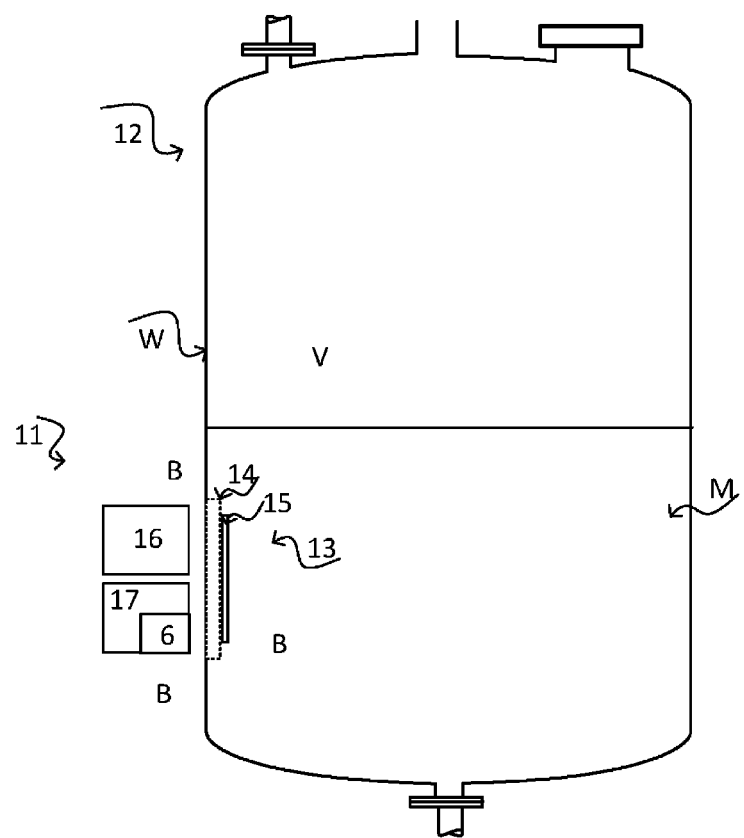
FIG. 3 shows a preferred embodiment of a sensor assembly according to the present disclosure.

FIG. 3 finally relates to a preferred embodiment of a sensor assembly 11 according to the invention for determining and/or monitoring a process variable and/or characteristic of a medium M in a container 12. For the example shown herein, a sensor device 13 is arranged within the container 12 (here a tank) and is fastened to the wall of the container 12. The sensor device 13 comprises a component 15 for which at least one magnetic property is dependent on the process variable and/or characteristic of the medium M and which is designed in the present case in the form of a thin, elongate element. For example, this component 15 can be an element made of a ferromagnetic or magnetostrictive material. In the present case, the component 15 is arranged on a carrier 14. However, . . . this is not mandatory, which is why the carrier 14 is shown in dashed lines.

The sensor assembly 11 further comprises a magnetic field device 16 for producing a magnetic field B in the region of the sensor device 13, at least part of the medium M and in the region of a detection device 17 which comprises a magnetic field sensor 6 according to the invention. The magnetic field B thus penetrates the detection device 17, the sensor device 13 and the medium M. The magnetic field B is influenced by the sensor device 13 or by the component 15, so that the process variable and/or characteristic of the medium M can be determined and/or monitored on the basis of the magnetic field B detected by the detection device 17, or on the basis of a detected variable related to the magnetic field B.

The invention claimed is:

1. A sensor assembly for determining and/or monitoring at least one process variable and/or characteristic of a medium in a container comprising a magnetic field sensor, including:
   a magnetoelectric sensor element which can mechanically oscillate, the sensor element having at least:
      one first layer made of a magnetostrictive material,
      a second layer made of a piezoelectric material, and
      at least one electrode made of an electrically conductive material, and electronics;
   the sensor assembly further comprising a device for producing a magnetic field in the region of the magnetic field sensor;
   wherein the magnetic field sensor is designed to induce mechanical oscillations of the sensor element by means of an excitation signal, and to receive the mechanical oscillations of the sensor element and to convert said mechanical oscillations into a reception signal; and
   produce the excitation signal from the reception signal; and
   determine a variable related to the magnetic field on the basis of the reception signal;
   wherein the magnetic field sensor and/or the device for producing the magnetic field is arranged and/or designed such that the magnetic field can be influenced as a function of a value for the process variable and/or characteristic of the medium, and wherein the sensor assembly is designed to determine and/or monitor the process variable and/or characteristic on the basis of the variable related to the magnetic field.

2. The sensor assembly according to claim 1, wherein the sensor element is a MEMS sensor element.

3. The sensor assembly according claim 1, wherein the sensor element can be induced to resonant oscillations.

4. The sensor assembly according to claim 1, wherein the sensor is designed to produce the excitation signal from the reception signal such that there is a specifiable phase shift between the excitation signal and the reception signal.

5. The sensor assembly according to claim 1, wherein the electronics comprise a phase control unit.

6. The sensor according to claim 1, wherein the sensor element comprises at least two electrically insulated electrodes which are applied to the second layer in particular in different regions.

7. The sensor assembly according to claim 1,
   wherein the electronics are designed to alternately execute a first and a second operating mode; the electronics are designed to
   induce mechanical oscillations of the sensor element in the first operating mode using an excitation signal, and
   to interrupt the excitation of the sensor element in the second operating mode, to receive the mechanical oscillations of the sensor element and to convert said mechanical oscillations into a reception signal, and to determine a variable related to the magnetic field (B) and/or a damping on the basis of the reception signal.

8. The sensor assembly according to claim 1,
   wherein the variable related to the magnetic field is the magnetic flux density, the magnetic susceptibility or the magnetic permeability.

9. The sensor assembly according to claim 1,
   comprising a sensor device which is designed and/or arranged such that at least one magnetic property of a component of the sensor device is dependent on the process variable and/or characteristic and that the magnetic field of the magnetic field device can be influenced by means of the sensor device as a function of the process variable and/or characteristic.

10. The sensor assembly according to claim 1,
   wherein the process variable and/or characteristic of the medium is the temperature, the pressure, the conductivity, or a flow rate of the medium.

* * * * *